May 17, 1927.
H. W. PLEISTER
1,628,684
METHOD OF MANUFACTURING THIN DRILL BLADES
Filed March 27, 1926    2 Sheets-Sheet 2
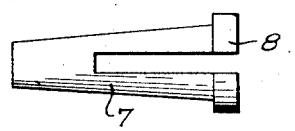
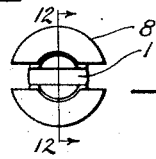
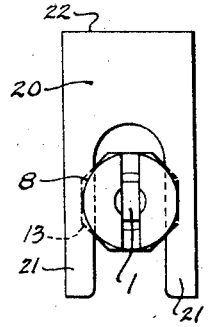
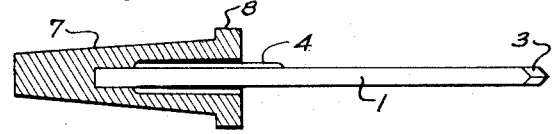
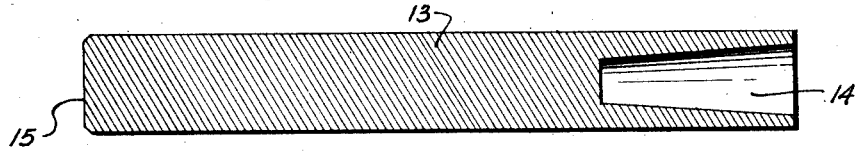
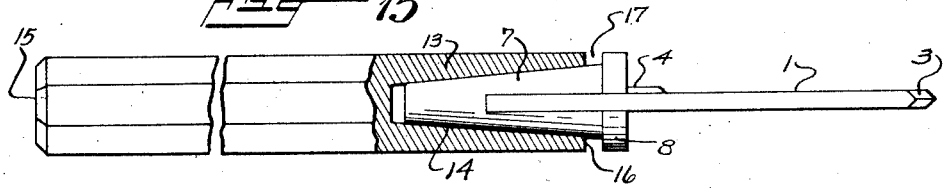
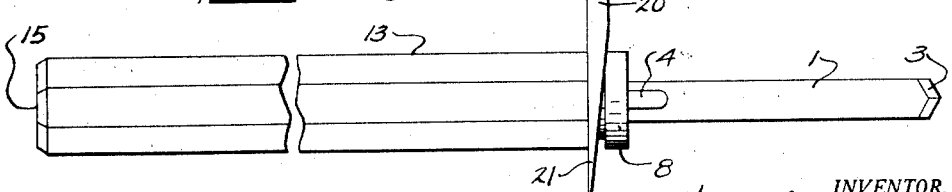
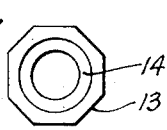
INVENTOR.
Henry W Pleister
BY
Alanby Johnson
ATTORNEY Patented May 17, 1927.

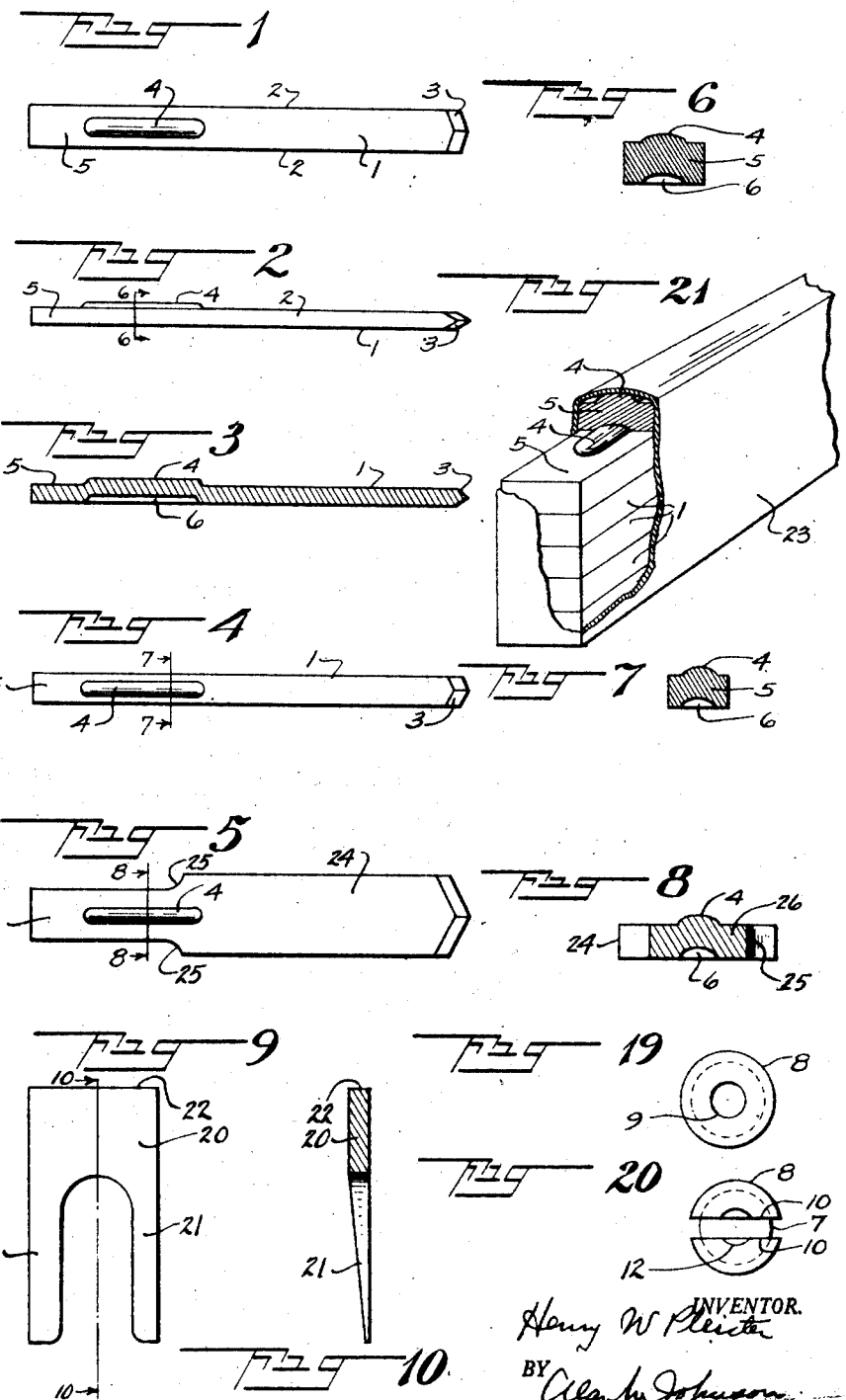

1,628,684

UNITED STATES PATENT OFFICE.

HENRY W. PLEISTER, OF WESTFIELD, NEW JERSEY, ASSIGNOR TO HENRY B. NEWHALL.

METHOD OF MANUFACTURING THIN DRILL BLADES.

Original application filed November 7, 1925, Serial No. 67,501. Divided and this application filed March 27, 1926. Serial No. 97,835.

This application is a division of my copending application Serial Number 67,501 filed November 7, 1925.

My present invention relates to the method of making thin flat drill blades from a thin flat rectangular cold bar of steel, at such a small cost that it is cheaper to discard the drill blade when dull, and use a new one, than to sharpen the old one.

My invention further relates to certain steps, and methods, all of which will be more fully hereinafter described and pointed out in the claims.

In the drawings the same reference numerals refer to similar parts in the several figures.

Fig. 1 is a plan view of one of my drill blades formed from relatively thin flat bar steel;

Fig. 2 is a side elevation of the blade shown in Fig. 1;

Fig. 3 is a longitudinal section;

Fig. 4 is a plan view of a blade, similar to Fig. 1 but narrower;

Fig. 5 is a plan view of a modified form of a drill blade, in which the shank is smaller than the other portion of the blade, so as to cooperate with a blade holder of a given size;

Fig. 6 is a transverse vertical section on line 6—6 of Fig. 2;

Fig. 7 is a transverse vertical section on the line 7—7 of Fig. 4;

Fig. 8 is a transverse vertical section on the line 8—8 of Fig. 5;

Fig. 9 is a plan view of one form of ejector which I preferably employ;

Fig. 10 is a longitudinal section on the line 10—10 of Fig. 9;

Fig. 11 is a plan view of a conical blade holder;

Fig. 12 is a longitudinal section on line 12—12 of Fig. 14 through the blade holder, shown in Fig. 11, cooperating with a drill blade;

Fig. 13 is a longitudinal vertical section through a drill member adapted to receive the tapered drill holder shown in Figs. 11 and 12;

Fig. 14 is an end elevation of Fig. 11;

Fig. 15 is a side elevation, partly broken away;

Fig. 16 is a plan showing the operation of the ejector;

Fig. 17 is an end elevation of Fig. 13;
Fig. 18 is an end elevation of Fig. 16;
Fig. 19 is an end elevation of the drill blade holder, prior to being slotted;
Fig. 20 is an end elevation of the drill blade holder, similar to Fig. 19, after being slotted;
Fig. 21 is a side elevation showing the manner of forming a package of nested blades.

Prior to my invention, drill points were commonly made tapered by suitable dies in forging machines. Where the sides of the dies came together some of the metal of the forging was forced between the dies, forming a web which was known as "flashing." These "flashings" had to be removed from the forging, which was commonly known as trimming or cutting off. All this was expensive in labor and the loss of material in the form of scrap. The resulting cost of the drill points was such that after they became dulled in use it was much more economical to have them repeatedly sharpened than to discard them and use a new drill point.

By my invention I make a drill point, in the form of a drill blade, from relatively thin flat bar steel at such a low cost that when they become dulled in use, it is more economical to discard the dull drill blade, and use a new one, rather than have the old one sharpened. A plurality of my drill blades can be nested together to form a package, which can be taken by the mechanic to the job, for replacements as soon as a drill blade becomes dull. In this manner a mechanic, in a given time, can do better and quicker work for he will always have a sharp drill to work with.

These drill blades can be quickly located in a drill holder, the drill holder being adapted to cooperate with a drill member; this drill member may be a handle of a hand operated drill, or a part of a power operated drill.

In the preferred form of my invention shown in the drawings, 1 is a drill blade formed from flat bar steel, having parallel sides 2, 2, a point 3 and preferably a strengthening rib or key 4 made by embossing the metal of the shank 5 of the blade. This forms a groove 6 on the opposite side of the blade from the strengthening rib or key 4. These blades may be made by hand, but are preferably made by feeding a bar of steel of the required width and thickness of the blade 1, into a punch press, where cutting the bar into the proper length for a blade, forming the point 3, and the embossed strengthening rib or key 4, is all done in one operation. When a sufficient quantity of these blades have been formed by the punch press, they are then tempered in mass so as to give them the proper temper.

It will be noted that as the bar steel is flat, and has parallel sides and is of the same thickness and width of blade 1, there will be no flashing and consequently no trimming to remove such flashing.

The length of the strengthening or embossed rib 4 may vary, being relatively long on the blades shown in Figs. 1, 2 and 3, and shorter on the blade shown in Figs. 4 and 5. This embossed rib also performs the function of a key to properly seat the blade in the conical blade holder 7.

This conical blade holder 7 is provided with the flange 8. It is first provided with an axial bore 9 (Fig. 19) for a part of its length. It is then slotted, as shown in Fig. 20, on the same center as the axial bore 9 so as to form the two spring jaws 10, 10 each jaw having a portion of the axial bore 9 which form key slots 12, 12 to cooperate with the embossed strengthening rib or key 4 on the drill blades 1. In placing the drill blade within the drill holder 7, one of these key slots 12 will immediately cooperate with the embossed key 4 and center the drill blade 1 within the drill holder 7. This will be true of all widths of blade within the range of the particular size drill holder 7, it, of course, being understood that different sizes of drill blades 1 may be used with a given size of drill holder 7.

The drill holder and drill blade (Fig. 2) is then placed in the cooperating drill member adapted to receive it. This drill member may be a handle 13, for a hand operated drill, or it may be any suitable part of a power drill. For purposes of description, I have illustrated this drill member as a handle 13 provided, for a portion of its length, with a tapered axial bore 14 within which partially seats the conical drill blade holder 7. This can be done by simply dropping the drill blade holder 7, with a drill blade 1 in it, into the conical tapered bore 14 and, then with a hammer, or other suitable tool, tapping the end 15 of the handle with one or two light taps of the hammer, when the parts will become seated as shown in Figs. 15 and 16; the flange 8 being spaced from the end 16 of the handle 13, leaving a gap 17 between these members.

After the point 3 of the drill blade 1 has become dulled, and it is desired to throw away that drill point, and use a new one, the ejector 20 (Figs. 9, 16 and 18), having the wedge fork 21, 21 is inserted between the end 16 of the drill member or handle, and the flange 8, straddling the blade holder 7 (Figs. 16 and 18). By then giving one or two taps of the hammer upon the end 22 of the ejector, the drill holder 7, with its blade 1, is instantly forced out of the conical seat 14 in the handle 13, so that the old drill blade 1 may be thrown away. A new drill blade may be taken, for example, from the package 23, and be placed in the drill blade holder 7, and that member be again repositioned in the drill handle 13 in the manner previously described.

By forming the drill blades flat with parallel sides and with an embossed strengthening rib or key 4, forming the groove 6 on the other side of the blade, a plurality of the drill blades can be readily nested, a rib or key of one blade being seated in the groove of the adjacent blade, so that a package 23 of a plurality of these drill blades can be readily made and easily carried in the pocket of the mechanic, ready for instant use when desired.

In Figs. 5 and 8, I have shown a modification of my invention in which the bar of steel from which the drill blade 24 has been formed, is cut away at 25, 25 to form a reduced shank 26 in which the embossed rib or key 4 is formed. This shank 26 can be used with the same drill blade holder 7 as will receive the drill blades shown in Figs. 1 to 4, and it will be centered by the key 4 cooperating with one of the key slots 12. Preferably I use the drill holder 7 for many different widths of drill blades, which can be accommodated between the jaws 10, 10 without cutting away any of the metal of the drill blade, though this may be done as shown in Figs. 5 and 8, in which case a wider range of widths of drills may be employed in the same drill holder 7.

Having thus described this invention in connection with illustrative embodiments thereof, to the details of which I do not desire to be limited, what is claimed as new and what is desired to secure by Letters Patent is set forth in the appended claims.

What I claim is:—

1. The method of manufacturing drill blades consisting in cutting a drill blade of the required length from a relatively thin cold flat steel bar, embossing a strengthening rib on the shank of the blade which also acts as a key and forming a groove on the opposite side of the blade, sharpening the point of the blade, and then tempering the blade.

2. The method of manufacturing drill blades consisting in feeding a relatively thin flat bar of cold steel to a punch press, cutting the bar into the required lengths for drill blades and at the same operation forming the point of the drill blade and an integral embossed strengthening rib on the shank of each blade which is adapted to act as a key, and a groove on the opposite side of the blade, the rib adapted to strengthen the blade and act as a key, the groove being adapted to receive the strengthening rib of another thin blade in nested and stacked relation.

3. The method of cheaply manufacturing drill blades in large quantities at such a small cost that it is cheaper to throw a dull blade away than to sharpen it, consisting in cutting the blades from a continuous strip of a thin flat cold soft steel bar rectangular in cross-section at the same time pressing or embossing the metal of the shank to form a strengthening rib on one side and a groove on the other to permit nesting of the blades, sharpening the blades and then tempering them, the completed drill blades being of the same rectangular contour as the continuous steel bar from which they are cut.

HENRY W. PLEISTER.